UNITED STATES PATENT OFFICE.

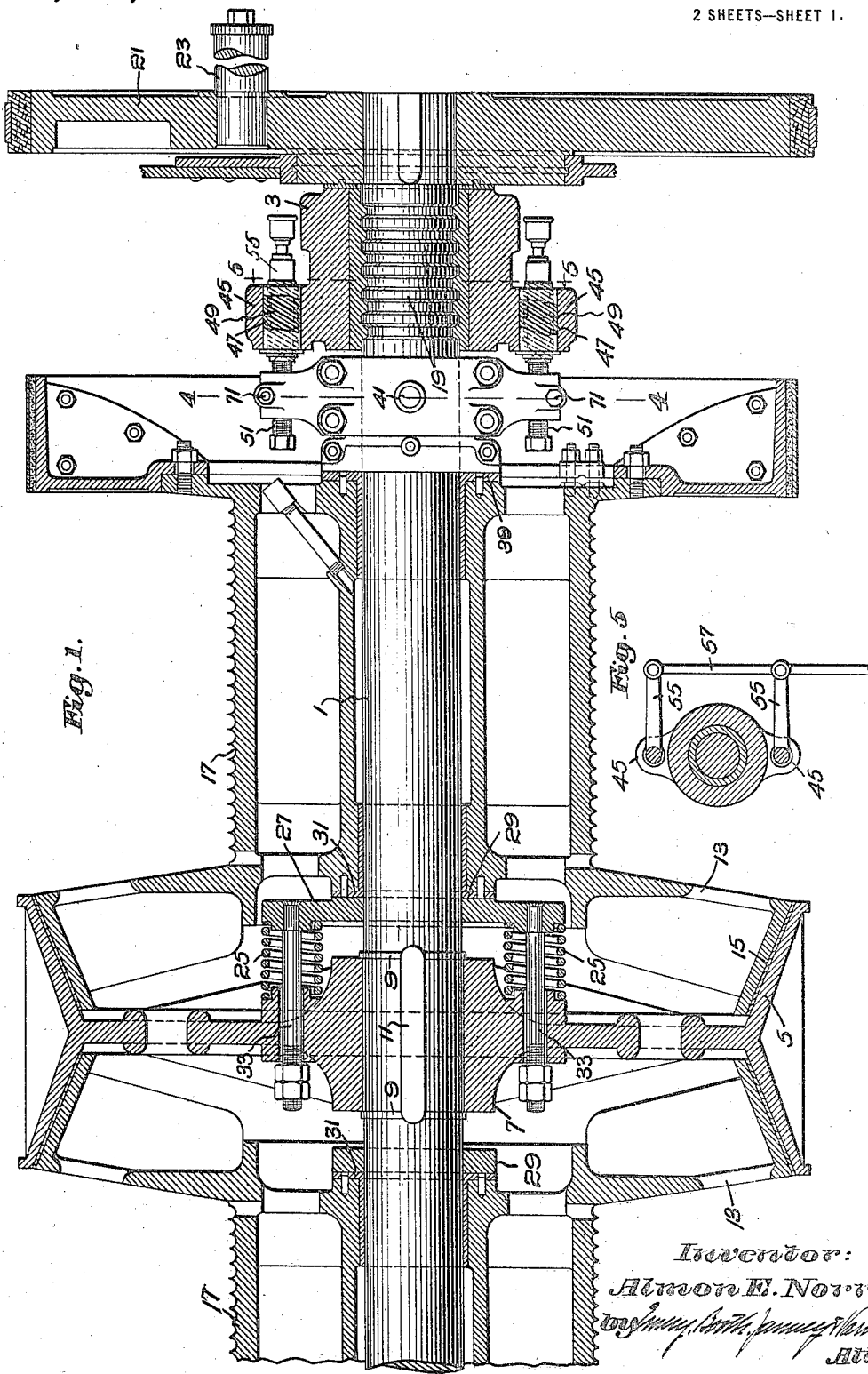

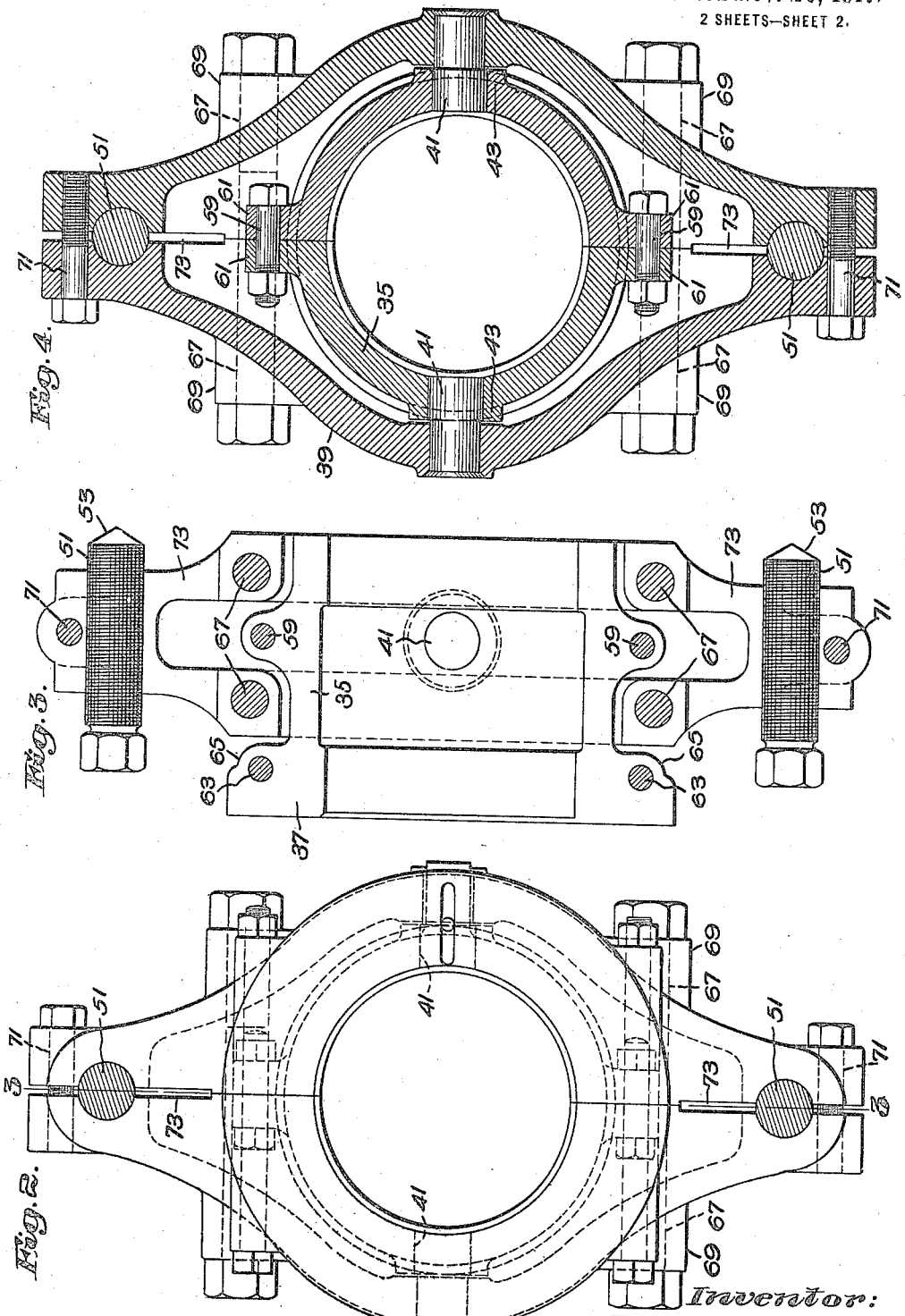

ALMON E. NORRIS, OF BROOKLINE, MASSACHUSETTS.

CLUTCH MECHANISM.

1,247,564.  Specification of Letters Patent.  Patented Nov. 20, 1917.

Application filed December 6, 1915. Serial No. 65,219.

*To all whom it may concern:*

Be it known that I, ALMON E. NORRIS, a citizen of the United States, and a resident of Brookline, county of Norfolk, State of Massachusetts, (whose post-office address is 47 Silk street, Brookline, Massachusetts,) have invented an Improvement in Clutch Mechanisms, of which the following description, in connection with the accompanying drawings, is a specification, like characters on the drawings representing like parts.

This invention relates to clutches such, for example, as are employed in hoisting apparatus, and is an improvement over the construction disclosed in Letters Patent No. 638,669, granted to me December 5, 1899.

The character of the invention may be best understood by reference to the following description of an illustrative embodiment thereof shown in the accompanying drawings, wherein:—

Figure 1 is a horizontal section through the clutch mechanism shown herein as illustrating the invention;

Fig. 2 on an enlarged scale is a side elevation of the clutch shifting yoke and ring;

Fig. 3 is a section taken on line 3—3 of Fig. 2;

Fig. 4 is a transverse section taken on line 4—4 of Fig. 1; and

Fig. 5 on a reduced scale is a transverse section taken on line 5—5 of Fig. 1.

Referring to the drawing the illustrative mechanism shown therein as embodying the invention comprises a shaft 1 (Fig. 1) having one end thereof journaled in a bearing in a standard 3, the opposite end of said shaft being journaled in a similar bearing not shown herein.

A clutch member 5 is mounted on said shaft and has a hub 7 confined against movement axially of said shaft by flanges 9 thereon. The member 5 is caused to rotate with said shaft by a key 11 connecting the same.

Coöperating with the fixed clutch member 5 is a movable clutch member 13 mounted on said shaft and movable axially thereof. The clutch members may have conical friction faces with a surfacing 15 of suitable friction material interposed between them.

The clutch member 13 is secured to one end of a winding drum 17 mounted on said shaft and adapted to receive a cable in a manner usual in hoisting apparatus.

To prevent movement of the shaft 1 axially of its bearing, it may be provided with a series of parallel circumferential ribs 19 projecting into a series of grooves in the bearing. Since the shaft 1 is confined against axial movement relatively to said bearing, it follows that the clutch member 5 which is fast on said shaft is confined against axial movement relatively to said bearing.

The shaft 1 may be rotated in any appropriate manner and is shown herein as provided with a disk 21 fast on an end thereof provided with a wrist pin 23 adapted to be connected with an engine.

The movable clutch member 13 is normally urged away from the fixed clutch member 5 by helical springs 25 confined between projections on the fixed clutch member 5 and a plate 27 having a face 29 adapted to bear against a bushing 31 secured to the drum. To limit the movement of the movable clutch member away from the fixed clutch member, rods 33 may be provided having ends connected to the plate 27 and other ends projecting through bores in said fixed clutch member and receiving adjusting and lock nuts.

Next will be described the means for thrusting the movable clutch member axially of the shaft 1 into active frictional engagement with the fixed clutch member 5 so that rotation imparted to the latter may be imparted to the former. To accomplish this, a ring 35 (Figs. 2, 3 and 4) is mounted on the shaft and provided with an enlarged end 37 adapted for end thrust engagement with a flanged bushing 38 (Fig. 1) secured to the end of the drum 17 opposite to the end carrying the movable clutch member. A yoke 39 is provided encircling the ring 35 and is connected thereto by diametrically opposed trunnions 41 fast in said yoke and projecting inwardly into bearings in bosses 43 on said ring. By this construction when the yoke is shifted axially of the shaft, it will impart movement to the ring and press the latter against the end of the drum and cause the same to bring the movable clutch member into engagement with the fixed clutch member.

To shift the yoke the bearing standard 3 (Fig. 1) referred to is provided with projecting supports 45 apertured to receive bushings 47 in which are threaded friction screws 49 adapted to engage ends of adjusting screws 51 threaded into said yoke. The adjusting screws have conical ends 53 which enter similarly shaped recesses in the ends of the friction screws 49 and prevent rotation of said yoke.

When the friction screws are rotated they will advance toward the left (Fig. 1) and press the yoke in the same direction, thereby causing the movable clutch member to be pressed into frictional engagement with the fixed clutch member with a force depending on the extent of advance of said friction screws. To rotate the latter they may be provided with arms 55 (Fig. 5) fast thereon connected by a rod 57, thereby permitting the two screws to be simultaneously adjusted.

The adjusting screws may be turned from time to time to take up wear and lost motion of the parts. These screws, however, are adjusted independently and therefore it is difficult to adjust both to the same degree. As a result the yoke is likely to be shifted so that it has a position in a plane offset from perpendicular to the axis of the shaft. In the construction in my aforesaid patent this position of the yoke was found to be seriously objectionable because the yoke fitted directly onto the shaft and any adjustment thereof out of a plane perpendicular to the shaft destroyed the proper fit between the yoke and the shaft and caused merely one end of the yoke to press against the end of the drum or caused one end of the yoke to press against the drum with greater force than the other. This produced a seriously objectionable wearing and binding of the parts.

In accordance with my present construction this objection has been overcome, since the yoke is not directly mounted on the shaft 1, but a ring is mounted in and connected thereto by trunnions, thereby permitting a rocking of the yoke out of a plane normal to the axis of the shaft without disturbing or affecting the proper fit of the ring on the shaft and without disturbing the proper uniform engagement and pressure of the ring against the end of the drum.

It is necessary from time to time to shift the movable clutch member a substantial distance away from the fixed clutch member for purposes of replacement or repair of parts thereof. To enable the movable clutch member to be so shifted, the yoke and ring must be removed from the shaft. To permit this the ring is split and the sections thereof are separably connected by bolts 59 entered through registering apertures in ears 61 projecting from said ring. The sections are further secured together by bolts 63 entered through registering apertures in ears 65 on the end thrust projection 3⁷ of the ring referred to. The yoke is also split and the sections thereof may be detachably connected by through bolts 67 projecting through registering apertures in bosses 69 on the sections of the yoke. The yoke sections may be further secured together by stud bolts 71 each entered through an aperture in one of the yoke sections and tapped into the other yoke section adjacent and transversely to the adjusting screws 51 referred to. The yoke sections may have sufficient stock removed therefrom adjacent the adjusting screws to form slots 73 which will permit more or less spring of the end portions of the sections. This will permit the stud bolts 71 to draw the ends of the sections into tight locking engagement with the adjustment screws 51 and thereby securely hold the latter in their different positions of adjustment without the use of locking nuts.

When it is desired to remove the ring and yoke from the shaft, the bolts connecting the yoke sections are released, thereby permitting the yoke sections to be spread apart and their trunnions to be drawn out of their bearings in the ring. Then the bolts connecting the ring sections may be released and removed from the shaft. Thus by a very simple operation the yoke and ring may be removed. This will allow sufficient room intermediate the end of the drum and the standard 3 to permit the movable clutch member to be shifted along the shaft a sufficient distance away from the fixed clutch member to permit a ready access to said members or either of them for purposes of replacement or repair thereof.

The enlarged end of the ring presents a strong bearing abutment for engagement with the bushing on the end of the drum and a large effective wear resisting face for engagement with said bushing.

The adjusting screws on the yoke are quickly and readily adjusted to take up lost motion and wear between the clutch members or other parts without the necessity of attempting equal adjustment thereof since the pivotal connection of the yoke with the ring will compensate for any such variation in adjustment and impart sliding movement to the ring without tending to rock the same out of axial alinement with the shaft and hence eliminating any possibility of binding or objectionable wear of the ring on the shaft and drum.

The mechanism described is strong and simple in construction, easy to operate and without likelihood of getting out of order.

Having described one illustrative embodiment of the invention without limiting the same thereto, what I claim as new and desire to secure by Letters Patent is:—

1. In a clutch mechanism, the combination with a shaft, of fixed and movable clutch members mounted thereon, a support, a split ring on said shaft, a split collar pivotally connected to said ring, means separably connecting the sections of said collar, means separably connecting the sections of said ring, and operating screws mounted on said support and coöperating with said collar for shifting said collar and ring axially along said shaft to thrust said movable clutch member relatively to said fixed clutch member.

2. In a clutch mechanism, the combination with a shaft, of fixed and movable clutch members mounted thereon, a support, a ring slidably mounted on said shaft intermediate said movable clutch member and support, a collar pivotally connected to said ring, and adjusting screws mounted on said support coöperating with said collar for shifting said collar and ring axially of said shaft to thrust said movable clutch member relatively to said fixed clutch member.

3. In a clutch mechanism, the combination with a shaft, of fixed and movable clutch members mounted on said shaft, a support, a ring slidably mounted on said shaft, a collar having diametrically opposed trunnions fast thereon fitting into bearings in said ring, and operating screws on said support coöperating with said collar for shifting said collar and ring axially of said shaft to thrust said movable clutch member relatively to said fixed clutch member.

4. In a clutch mechanism, the combination with a shaft, of fixed and movable clutch members mounted on said shaft, a support, a ring slidably mounted on said shaft, a collar encircling said ring, diametrically opposed studs pivotally connecting said ring and collar, the latter being split on a plane transversely to the axis of said studs, and means coöperating with said collar for shifting said collar and ring axially of said shaft to adjust said movable clutch member relatively to said fixed clutch member.

5. In a clutch mechanism, the combination with a shaft, of a support, a split ring slidable axially of said shaft having an enlarged end thrust bearing, bolts connecting the parts of said ring, a split collar pivotally connected to said ring, bolts connecting the parts of said collar, adjusting screws on said collar, operating screws on said support adapted to engage the ends of said adjusting screws for shifting said collar and ring axially of said shaft to thrust said movable clutch member relatively to said fixed clutch member.

6. In a clutch mechanism, the combination with a shaft, of fixed and movable clutch members mounted thereon, a support, a ring slidably mounted on said shaft, a collar pivotally connected to said ring, said collar and ring each comprising separably connected sections removable from said shaft to allow movement of the movable clutch member axially of the shaft, and operating screws for shifting said collar and ring axially of said shaft to thrust said movable clutch member relatively to said fixed clutch member.

7. In a clutch mechanism, the combination with a shaft, of fixed and movable clutch members mounted thereon, a support, a ring mounted on said shaft having separable sections, bolts connecting said sections, a collar pivotally connected to said ring and comprising separable sections, bolts connecting said sections, said collar having resilient portions, adjusting screws threaded between said portions, bolts for drawing said portions into tight gripping engagement with said screws, and operating screws mounted on said support for engagement with said adjusting screws to shift said collar and ring axially of said shaft and move said adjustable clutch member relatively to said fixed clutch member.

8. In a clutch mechanism, the combination with a shaft 1 of fixed and movable clutch members 5 and 13, a support 3, a ring 35 slidably mounted on said shaft, a collar 39 having trunnions 41 journaled in bearings in said ring, said collar and ring being split to permit the removal thereof from said shaft to allow movement of the movable clutch member along said shaft, adjusting screws 51 threaded into said collar, operating screws 49 mounted on said support for engagement with said adjusting screws, arms 55 fast on said operating screws, and a member 57 connecting said arms.

In testimony whereof, I have signed my name to this specification, in the presence of two subscribing witnesses.

ALMON E. NORRIS.

Witnesses:
HENRY T. WILLIAMS,
ROBERT H. KAMMLER.

Copies of this patent may be obtained for five cents each, by addressing the "Commissioner of Patents, Washington, D. C."